(12) United States Patent
Leonard

(10) Patent No.: US 7,711,734 B2
(45) Date of Patent: May 4, 2010

(54) SYSTEMS AND METHODS FOR MINING TRANSACTIONAL AND TIME SERIES DATA

(75) Inventor: Michael James Leonard, Apex, NC (US)

(73) Assignee: SAS Institute Inc., Cary, NC (US)

( * ) Notice: Subject to any disclaimer, the term of this patent is extended or adjusted under 35 U.S.C. 154(b) by 353 days.

(21) Appl. No.: 11/696,951

(22) Filed: Apr. 5, 2007

(65) Prior Publication Data

US 2007/0239753 A1 Oct. 11, 2007

Related U.S. Application Data

(60) Provisional application No. 60/789,862, filed on Apr. 6, 2006.

(51) Int. Cl.
*G06F 17/30* (2006.01)

(52) U.S. Cl. ........................ 707/736; 707/737; 707/752; 707/754

(58) Field of Classification Search ........................ None
See application file for complete search history.

(56) References Cited

U.S. PATENT DOCUMENTS

| | | | |
|---|---|---|---|
| 5,991,740 A | 11/1999 | Messer | |
| 5,995,943 A | 11/1999 | Bull et al. | |
| 6,052,481 A * | 4/2000 | Grajski et al. | ................ 382/187 |
| 6,128,624 A | 10/2000 | Papierniak et al. | |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |
| 6,286,005 B1 | 9/2001 | Cannon | |
| 6,308,162 B1 | 10/2001 | Ouimet et al. | |
| 6,317,731 B1 | 11/2001 | Luciano | |
| 6,334,110 B1 | 12/2001 | Walter et al. | |
| 6,397,166 B1 * | 5/2002 | Leung et al. | ................ 702/179 |
| 6,400,853 B1 * | 6/2002 | Shiiyama | .................... 382/305 |

(Continued)

OTHER PUBLICATIONS

Keogh, E. & Pazzani, M. (2001). Derivative Dynamic Time Warping. In First SIAM International Conference on Data Mining (SDM'2001), Chicago, USA, p. 5-6.*

(Continued)

*Primary Examiner*—Pierre M Vital
*Assistant Examiner*—Taelor Kim
(74) *Attorney, Agent, or Firm*—Jones Day

(57) ABSTRACT

In accordance with the teachings described herein, systems and methods are provided for analyzing transactional data. A similarity analysis program may be used that receives time-series data relating to transactions of an organization and performs a similarity analysis of the time-series data to generate a similarity matrix. A data reduction program may be used that receives the time-series data and performs one or more dimension reduction operations on the time-series data to generate reduced time-series data. A distance analysis program may be used that performs a distance analysis using the similarity matrix and the reduced time-series data to generate a distance matrix. A data analysis program may be used that performs a data analysis operation, such as a data mining operation, using the distance matrix to generate a data mining analysis of the transactional data.

31 Claims, 15 Drawing Sheets

U.S. PATENT DOCUMENTS

| | | | |
|---|---|---|---|
| 6,526,405 | B1 | 2/2003 | Mannila et al. |
| 6,539,392 | B1 | 3/2003 | Rebane |
| 6,542,869 | B1* | 4/2003 | Foote .......................... 704/500 |
| 6,564,190 | B1 | 5/2003 | Dubner |
| 6,591,255 | B1 | 7/2003 | Tatum et al. |
| 6,640,227 | B1 | 10/2003 | Andreev |
| 6,735,738 | B1* | 5/2004 | Kojima ....................... 715/202 |
| 6,775,646 | B1 | 8/2004 | Tufillaro et al. |
| 6,792,399 | B1 | 9/2004 | Phillips et al. |
| 6,850,871 | B1 | 2/2005 | Barford et al. |
| 6,878,891 | B1 | 4/2005 | Josten et al. |
| 6,928,398 | B1 | 8/2005 | Fang et al. |
| 7,072,863 | B1 | 7/2006 | Phillips et al. |
| 7,103,222 | B2 | 9/2006 | Peker |
| 7,171,340 | B2 | 1/2007 | Brocklebank |
| 7,216,088 | B1 | 5/2007 | Chappel et al. |
| 7,236,940 | B2 | 6/2007 | Chappel |
| 7,251,589 | B1 | 7/2007 | Crowe et al. |
| 7,260,550 | B1 | 8/2007 | Notani |
| 7,610,214 | B1* | 10/2009 | Dwarakanath et al. ........ 705/10 |
| 2002/0169657 | A1 | 11/2002 | Singh et al. |
| 2003/0105660 | A1 | 6/2003 | Walsh et al. |
| 2003/0110016 | A1 | 6/2003 | Stefek et al. |
| 2003/0187719 | A1 | 10/2003 | Brocklebank |
| 2003/0200134 | A1 | 10/2003 | Leonard et al. |
| 2004/0172225 | A1* | 9/2004 | Hochberg et al. .............. 703/2 |
| 2005/0102107 | A1* | 5/2005 | Porikli ........................ 702/20 |
| 2005/0249412 | A1* | 11/2005 | Radhakrishnan et al. .... 382/173 |
| 2006/0063156 | A1* | 3/2006 | Willman et al. ................ 435/6 |
| 2006/0064181 | A1 | 3/2006 | Kato |
| 2006/0112028 | A1 | 5/2006 | Xiao et al. |
| 2006/0143081 | A1* | 6/2006 | Argaiz ......................... 705/14 |
| 2006/0247900 | A1* | 11/2006 | Brocklebank ............... 702/189 |
| 2007/0291958 | A1* | 12/2007 | Jehan ......................... 381/103 |
| 2008/0294651 | A1* | 11/2008 | Masuyama et al. .......... 707/100 |

OTHER PUBLICATIONS

Tim Oates et al., Clustering Time Series with Hidden Markov Models and Dynamic Time Warping, 1999, Computer Science Department, LGRC University of Massachusetts, In Proceedings of the IJCAI-99, p. 1-5.*

"Data Mining Group", http://www.dmg.org, printed May 9, 2005, 3 pp.

Kumar, Mahesh, "Combining Forecasts Using Clustering", Rutcor Research Report 40-2005, Dec. 2005, cover page and pp. 1-16.

Leonard, Michael, "Promotional Analysis and Forecasting for Demand Planning: A Practical Time Series Approach", with exhibits 1 and 2, SAS Institute Inc., Cary, North Carolina, 2000, 50 pp.

Leonard, Michael, "Large-Scale Automatic Forecasting Using Inputs and Calendar Events", abstract and presentation, International Symposium on Forecasting Conference, Jul. 4-7, 2004, 56 pp.

Leonard, Michael et al., "Mining Transactional and Time Series Data", abstract and presentation, International Symposium of Forecasting, 2003, 23 pp.

Leonard, Michael, "Large-Scale Automatic Forecasting: Millions of Forecasts", abstract and presentation, International Symposium of Forecasting, 2002, 156 pp.

Leonard, Michael et al., "Mining Transactional and Time Series Data", abstract, presentation and paper, SUGI, Apr. 10-13, 2005, 142 pp.

Leonard, Michael, "Predictive Modeling Markup Language for Time Series Models", abstract and presentation, International Symposium on Forecasting Conference, Jul. 4-7, 2004, 35 pp.

Leonard, Michael, "Large-Scale Automatic Forecasting Using Inputs and Calendar Events", White Paper, 2005, pp. 1-27.

Crowe, Keith E. et al., U.S. Appl. No. 11/431,089, filed May 9, 2006 entitled "Computer-Implemented System and Method for Generating Forecasts".

Jackson, Wilma S. et al., U.S. Appl. No. 11/431,127, filed May 9, 2006 entitled "Computer-Implemented Systems and Methods for Defining Events".

Park, Youngjin et al., U.S. Appl. No. 11/431,116, filed May 9, 2006 entitled "Computer-Implemented Systems and Methods for Processing Time Series Data".

Crowe, Keith E, et al., U.S. Appl. No. 11/431,123, filed May 9, 2006 entitled "Computer-Implemented Systems and Methods for Storing Data Analysis Models".

van Wijk, Jarke J. et al., "Cluster and Calendar based Visualization of Time Series Data", IEEE Symposium on Information Visualization (INFOVIS '99), San Francisco, pp. 1-6 [Oct. 25-26, 1999].

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Harrison, H.C. et al., "An Intelligent Business Forecasting System", ACM Annual Computer Science Conference, pp. 229-236 (1993).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Abstract, Kobbacy, Khairy A.H., et al., "Towards the development of an intelligent inventory management system", Integrated Manufacturing Systems, vol. 10, Issue 6, 1999 (11 pp.).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Abstract, Park, Kwan Hee, "Development and evaluation of a prototype expert system for forecasting models", Mississippi State University, 1990 (1 pg.).

Abstract, Tashman, Leonard J. et al., "Automatic Forecasting Software: A Survey and Evaluation", International Journal of Forecasting, vol. 7, Issue 2, Aug. 1991 (1 pg.).

Wang, Liang et al., "An Expert System for Forecasting Model Selection", IEEE, pp. 704-709 (1992).

Product Brochure, ForecastPRO, 2000 (12 pp.).

Automatic Forecasting Systems Inc., Autobox 5.0 for Windows User's Guide, 82 pp. (1999).

Quest Software, "Funnel Web Analyzer: Analyzing the Way Visitors Interact with Your Web Site", http://www.quest.com/funnel_web/analyzer (2 pp.).

Funnel Web Web site Analysis Report, Funnel Web Demonstration, Clients History, http://www/quest.com/funnel_web/analyzer/sample.ClientHist.html (2 pp.).

Funnel Web Web site Analysis Report, Funnel Web Demonstration, Authenticated Users History, http://www.quest.com/funnel_web/analyzer/sample/UserHist.html (1 pg.).

SAS Institute Inc., SAS/ETS User's Guide, Version 8, pp. 577-631 and 1307-1323 (1999).

* cited by examiner

SYSTEMS AND METHODS FOR MINING TRANSACTIONAL AND TIME SERIES DATA

CROSS-REFERENCE TO RELATED APPLICATIONS

This application claims priority from U.S. Provisional Patent Application No. 60/789,862, titled "Systems and Methods for Mining Time Series Data," filed on Apr. 6, 2006, the entirety of which is incorporated herein by reference.

FIELD

The technology described in this patent document relates generally to data analysis techniques for transactional databases.

BACKGROUND AND SUMMARY

Transactional databases typically collect large amounts of time-stamped data relating to an organization's suppliers or customers over time. Examples of such transactional databases include web sites, point-of-sale (POS) systems, call centers, inventory systems, and others. Data mining techniques are often used to derive knowledge from such transactional databases. However, the size of each set of transactional data may be quite large, making it difficult to perform many traditional data mining tasks.

In accordance with the teachings described herein, systems and methods are provided for analyzing transactional data. A similarity analysis program may be used that receives time-series data relating to transactions of an organization and performs a similarity analysis of the time-series data to generate a similarity matrix. A data reduction program may be used that receives the time-series data and performs one or more dimension reduction operations on the time-series data to generate reduced time-series data. A distance analysis program may be used that performs a distance analysis using the similarity matrix and the reduced time-series data to generate a distance matrix. A data analysis program may be used that performs a data analysis operation, such as a data mining operation, using the distance matrix to generate a data mining analysis of the transactional data.

DETAILED DESCRIPTION

Figure 1:
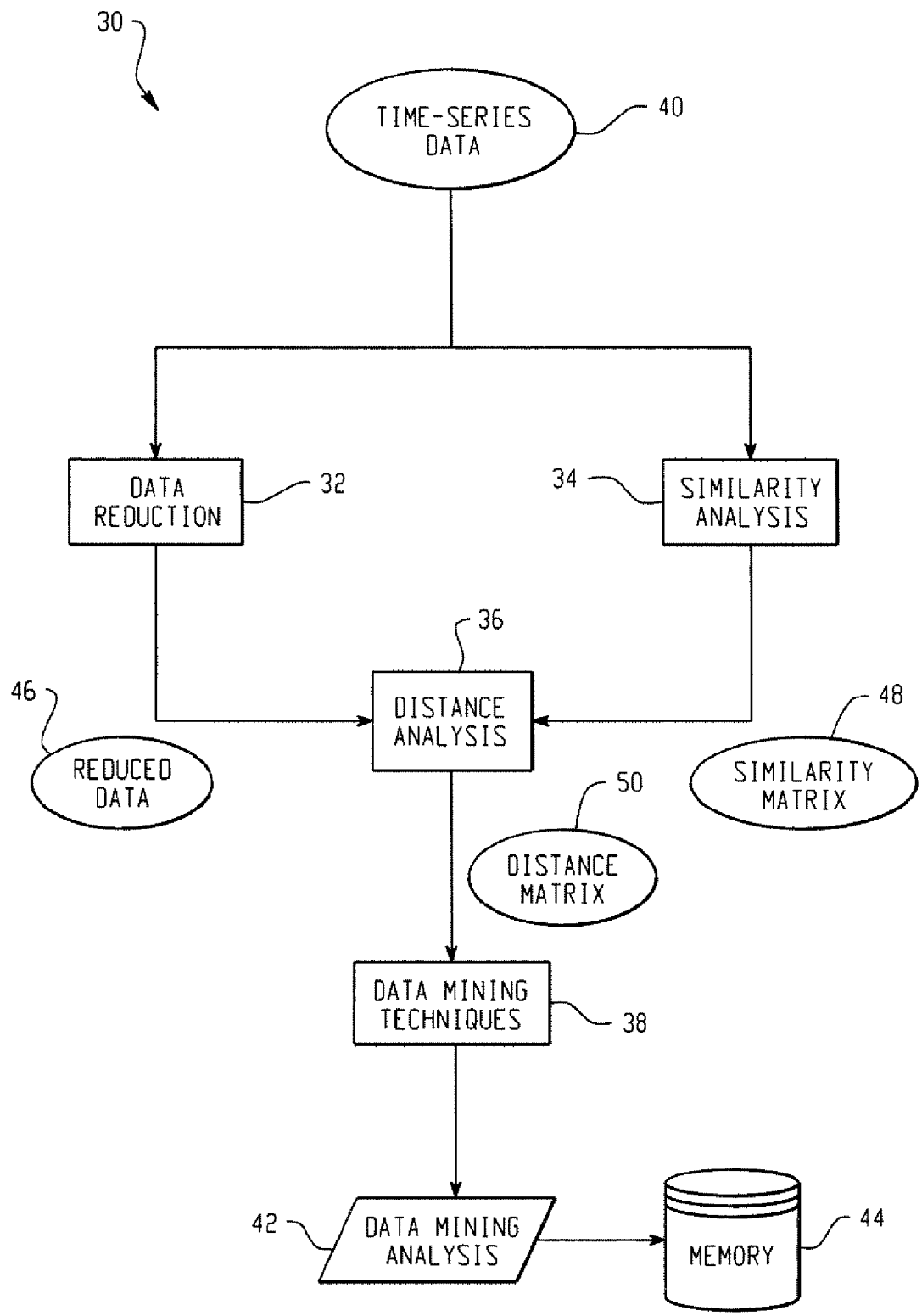
FIG. 1 is a block diagram illustrating an example system and method for generating a data mining analysis of transactional data.

FIG. 1 is a block diagram illustrating an example computer-implemented system and method 30 for generating an analysis of transactional data. The system 30 includes multiple computer-implemented processes (referred to herein as "blocks") that may be performed by one or more programs stored in one or more computer-readable medium and executing on one or more computers, including a data reduction block 32, a similarity analysis block 34, a distance analysis block 36, and a data mining block 38. In operation, the system receives time-series data 40 relating to transactions of an organization, and generates a data analysis, such as a data mining analysis 42, of the data that is stored in a computer-readable medium 44.

The time-series data 40 is input to both the data reduction block 32 and the similarity analysis block 34. The time-series data 40 is made up of transactional data that is stored with some indication of time (referred to herein as "time-stamped data") and that is accumulated over time at a particular frequency. Some examples of time-series data include web sites visited per hour, sales per month, inventory draws per week, calls per day, trades per weekday, etc.

The data reduction block 32 performs one or more dimension reduction operations on the time-series data 40 to generate reduced time-series data 46. Traditional data mining techniques are typically applied to large data sets with observation vectors that are relatively small in dimension when compared to the length of a time-series. In order to effectively apply these data mining techniques to a large number of series, the dimensions of each series may be reduced to a small number of statistics that capture their descriptive properties. Examples of dimension reduction operations that may be used, possibly in combination, to capture the descriptive properties for each time series include time domain analysis, frequency domain analysis, seasonal adjustment/decomposition and time-series modeling.

The similarity analysis block 34 performs a similarity analysis of the time-series data to generate a similarity matrix 48. In order to perform a similarity analysis, the component time series in the time-series data 40 are compared. Given two ordered numeric sequences (input and target), such as two time series, a similarity measure is a metric that measures the distance between the input and target sequences while taking into account the ordering. The similarity matrix 48 is generated by computing similarity measures between multiple time series.

The distance analysis block 36 performs a distance analysis using the similarity matrix 48 and the reduced time-series data 46 to generate a distance matrix 50. In order to generate a distance matrix 50, the reduced time-series data 46 and distance matrix 50 are combined into a data matrix with uniform dimensions, such as a series properties matrix. Statistical distances are then computed between vectors in the data matrix to generate the distance matrix 50.

The data mining block 38 performs one or more data mining operations using the distance matrix 50 to generate the data mining analysis 42. Numerous data mining techniques may be used by the data mining block 38 to generate the data mining analysis 42 with information that is useful for evaluating the time series data. Examples include sampling, clustering, classification and decision trees.

Figure 2:
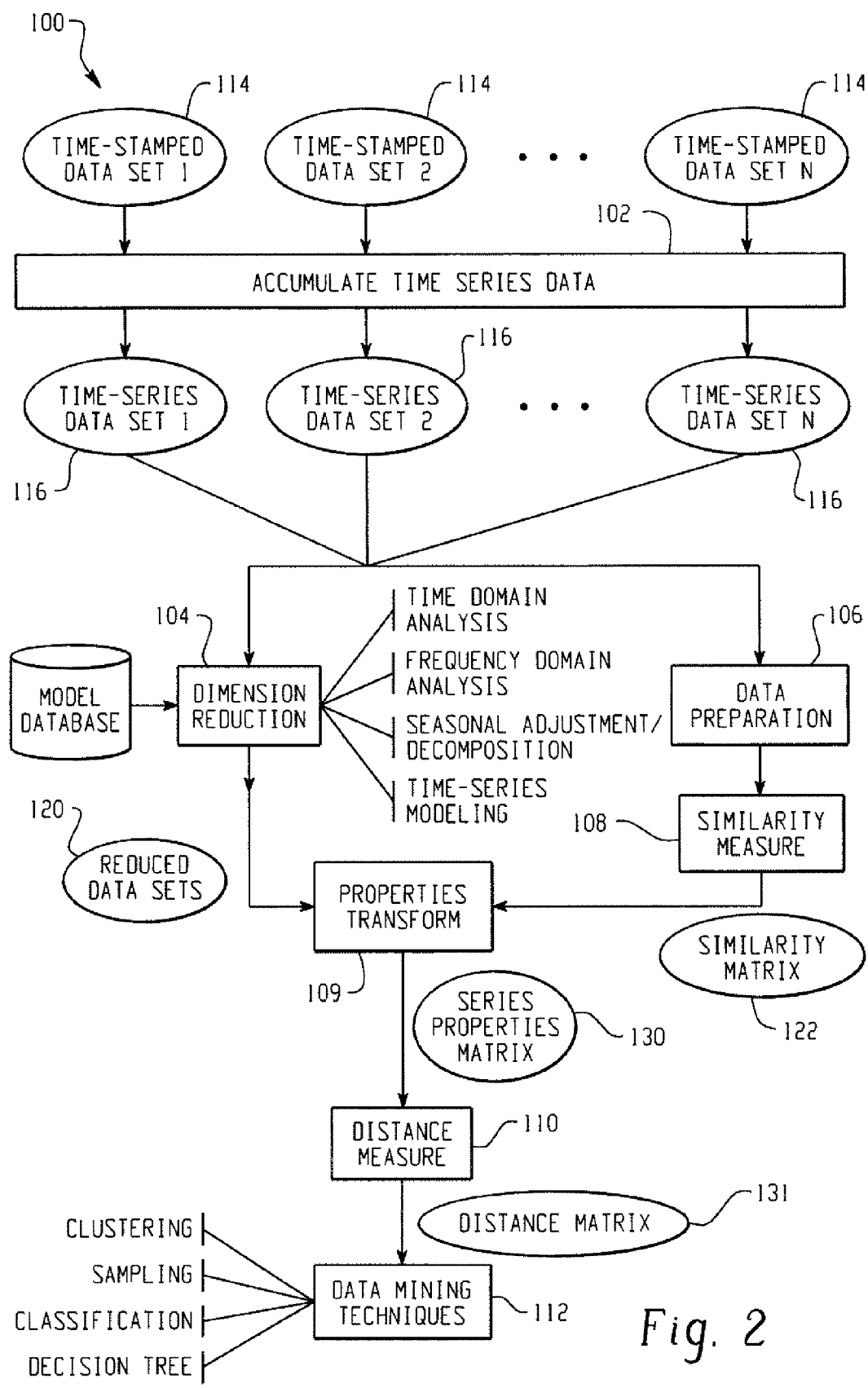
FIG. 2 is a block diagram illustrating another example system and method for generating a data mining analysis of transactional data.

FIG. 2 is a block diagram illustrating another example system and method 100 for generating a data mining analysis of transactional data. The system 100 includes a data accumulation block 102, a dimension reduction block 104, a data preparation block 106, a similarity analysis block 108, a properties transform block 109, a distance analysis block 110 and a data mining block 112. In operation, the system 100 accumulates transactional data 114 into time-series data 116 and reduces the data to a form on which one or more data mining techniques may be performed.

Figure 3:
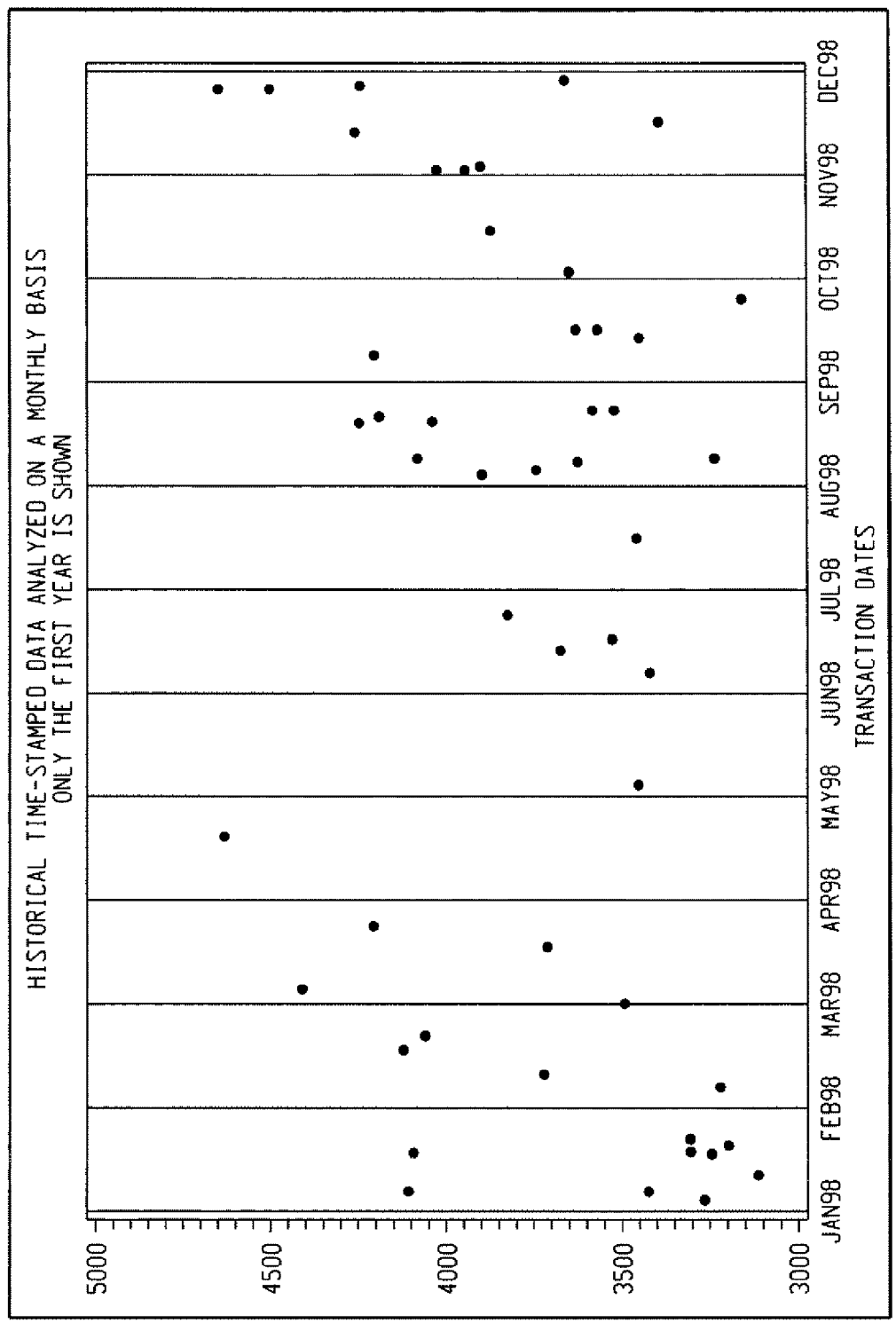
FIGS. 3 and 4 illustrate the accumulation of transactional data into time-series data.
Figure 4:
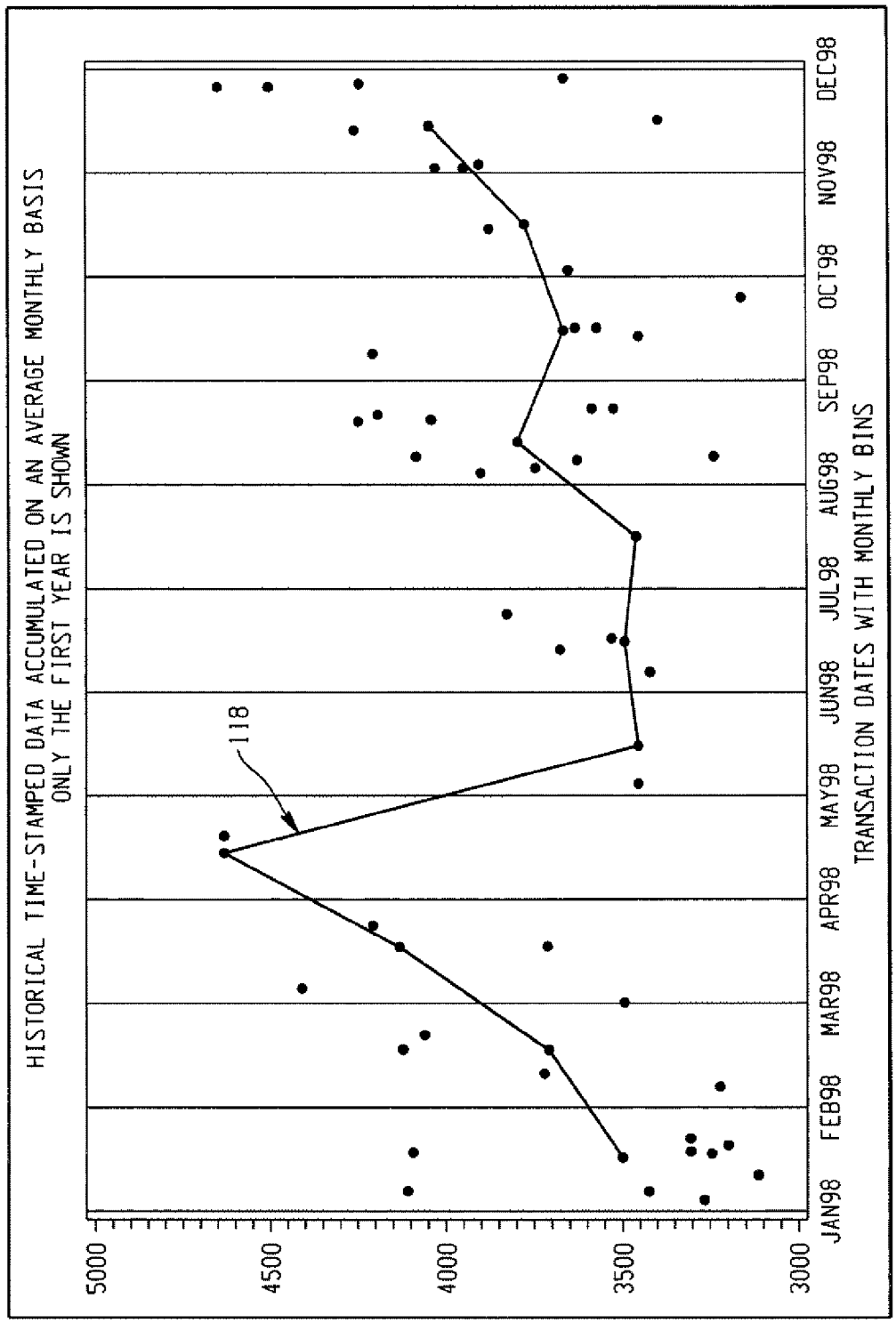

The accumulation block 102 receives a plurality of sets of time-stamped transactional data 114 and accumulates the time-stamped data 114 into a plurality of sets of time-series data 116. The accumulation of time-stamped data 114 into time-series data 116 is based on a particular frequency. For example, time-stamped data 114 can be accumulated to form hourly, daily, weekly, monthly or yearly time series. Additionally, the method for accumulating the transactions within each time period is based on a particular statistic. For example, the sum, mean, median, minimum, maximum, standard deviation and/or other statistics can be used to accumulate the transactions within a particular time period. As an example, FIG. 3 illustrates a set of time-stamped data that is recorded over a year's time. FIG. 4 illustrates the accumulation of the set of time-stamped data on a monthly basis based on the average value. The time-series 118, illustrated by the solid line in FIG. 4, is calculated in this example by averaging the time-stamped data for each month. It should be understood, however, that other statistics could also be used to accumulate time-stamped data.

Referring again to FIG. 2, the time-series data 116 is input to both the dimension reduction block 104 and the data preparation block 106. The data reduction block 104 performs one or more dimension reduction operations on the time-series data 116 to generate reduced time-series data 120. Examples of dimension reduction operations that may be used, possibly in combination, to generate the reduced time-series data 120 include time domain analysis, frequency domain analysis, seasonal adjustment/decomposition, time-series modeling and forecasting. Examples of dimension reduction operations are illustrated in FIGS. 5-9, which are described in more detail below.

Many transactional and time series databases store data in longitudinal form, whereas many data mining software packages require the data to be in coordinate form. The dimension reduction operation(s) performed by the dimension reduction block 104 may extract features of the longitudinal dimension of the series and store the reduced sequence in coordinate form of fixed dimension. For instance, assume that there are N series with lengths $\{T_1, \ldots, T_N\}$. In longitudinal form, each variable (or column) represents a single series, and each variable observation (or row) represents the series value recorded at a particular time. Notice that the length of each series, $T_i$, can vary: $Y_i = \{y_{i,t}\}_{t=1}^{T_i}$ for $i=1, \ldots, N$, where $Y_i$ is $(T_i \times 1)$. This form is convenient for time series analysis but less desirable for data mining.

In coordinate form, each observation (or row) represents a single reduced sequence, and each variable (or column) represents the reduced sequence value. Notice that the length of each reduced sequence, M, is fixed: $R_i = \{r_{i,m}\}_{m=1}^{M}$ for $i=1, \ldots, N$, where $R_i$ is $(1 \times M)$. This form is convenient for data mining but less desirable for time series analysis.

To reduce a single series, a univariate reduction transformation may be used to map the varying longitudinal dimension to the fixed coordinate dimension: $R_i = F_i[Y_i]$ for $i=1, \ldots, N$, where $R_i$ is $(1 \times M)$, $Y_i$ is $(T_i \times 1)$, and $F_i[\ ]$ is the reduction transformation (e.g., seasonal decomposition). For multivariate series reduction, more than one series is reduced to a single reduction sequence. The bivariate case may be expressed as: $R_i = F_i[Y_i, X_i]$ for $i=1, \ldots, N$, where $R_i$ is $(1 \times M)$, $Y_i$ is $(T_i \times 1)$, $X_i$ is $(T_i \times 1)$, and $F_i[\ ]$ is the reduction transformation (e.g., cross-correlations). It should be understood that the reduction transformation, $F_i[\ ]$, is indexed by the series index, $i=1, \ldots, N$, but typically it does not vary and thus is assumed to be the same, that is, $F[\ ] = F_i[\ ]$.

Tables 1 and 2, set forth below, illustrate an example of the above formulas in tabular form. In the tables, a single period '.' refers to a missing value, and three consecutive periods '...' refer to continuation.

TABLE 1

Series Table
Series Table-Longitudinal Form-each series of varying dimension

| Time Index | $Y_1$ | ... | $Y_N$ |
|---|---|---|---|
| 1 | $y_{1,1}$ | ... | $y_{N,1}$ |
| 2 | $y_{1,2}$ | ... | $y_{N,2}$ |
| ... | ... | ... | ... |
| $T_1$ | $y_{1,T_1}$ | ... | $y_{N,T_1}$ |
| ... | ... | ... | ... |
| $T_N$ | ... | ... | $y_{N,T_N}$ |

TABLE 2

Reduced Table
Reduced Table-Coordinate Form-each sequence of fixed dimension

| Series Index/Reduced Row | | $r_{\cdot,1}$ | ... | $r_{\cdot,M}$ |
|---|---|---|---|---|
| 1 | $R_1$ | $r_{1,1}$ | ... | $r_{1,M}$ |
| ... | | | ... | |
| N | $R_N$ | $r_{N,1}$ | ... | $r_{N,M}$ |

In the above example, dimension reduction transforms the series table (Table 1) (T×N) to the reduced table (Table 2) (N×M), where T=max $\{T_1, \ldots, T_N\}$ and where typically M<T. The number of series, N, can be quite large; therefore, even a simple reduction transform requires the manipulation of a large amount of data. Hence, the data should be put into the proper format to avoid having to post-process large data sets.

As described above, transactional and time series analysis can reduce a single transactional or time series to a relatively small number of descriptive statistics. In addition, the reduced data can be combined or merged with other categorical data (e.g., age, gender, income, etc.) For example, suppose that the rather large transaction history of a single customer is reduced to a small number of statistics using seasonal decomposition; the seasonal indices can be combined with the customer's income and gender. This combined data set can then be analyzed using both the seasonal indices and categorical data. Such an analysis may be difficult or impossible if the high-dimension series data was used directly.

Referring again to FIG. 2, the data preparation block 106 is used to pre-process the time-series data 116 prior to the similarity analysis 108. The pre-processing may include smoothing, decomposition/adjustment and/or other known data preparation processes. The pre-processed time-series data is then input to the similarity analysis block 108, which performs a similarity analysis of the data to generate a similarity matrix 122.

Given sets of time-series data 116, a specified similarity analysis technique, Sim( ), may be used to measure the similarity between each series: $s_{i,j} = \text{Sim}(\vec{y}_i, \vec{y}_j)$, where Sim( ) measures the similarity between the $i^{th}$ and $j^{th}$ series. The resulting similarity matrix, $S = \{\vec{s}_i\}_{i=1}^{N}$, has uniform dimension (N×N), which are needed for many data mining techniques. There are many known similarity analysis techniques which may be used in this manner to generate a similarity matrix 122. For example, $s_{i,j}$ may represent the dynamic time warping similarity measure between the $i^{th}$ and $j^{th}$ products. In another example, $s_{i,j}$ may represent the derivative dynamic time warping measure between the $i^{th}$ and $j^{th}$ products. In yet another example, $s_{i,j}$ may represent the longest common subsequence similarity measure between the $i^{th}$ and $j^{th}$ products.

Figure 10:
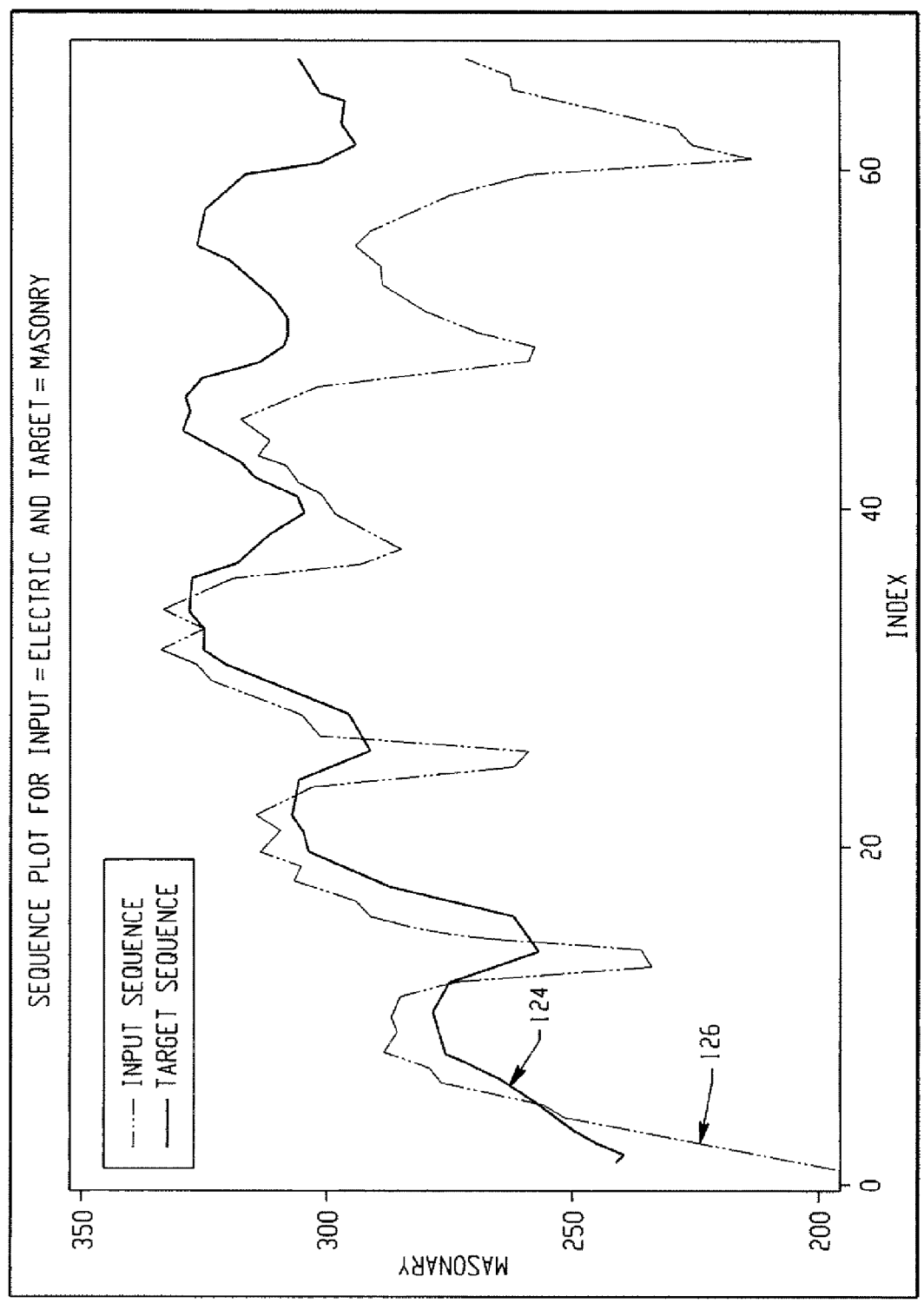
FIGS. 10-13 illustrate an example similarity analysis.
Figure 11:
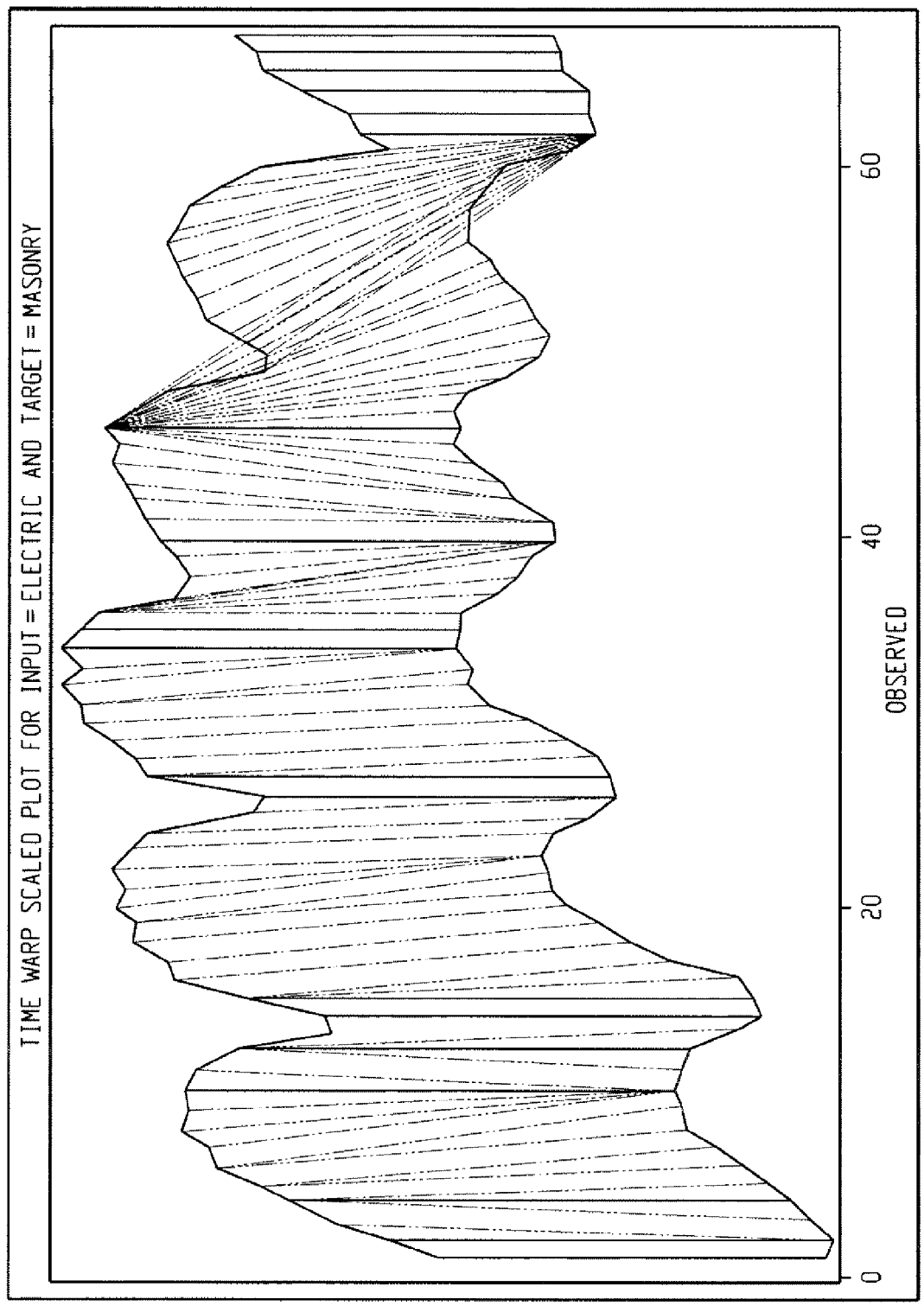
Figure 12:
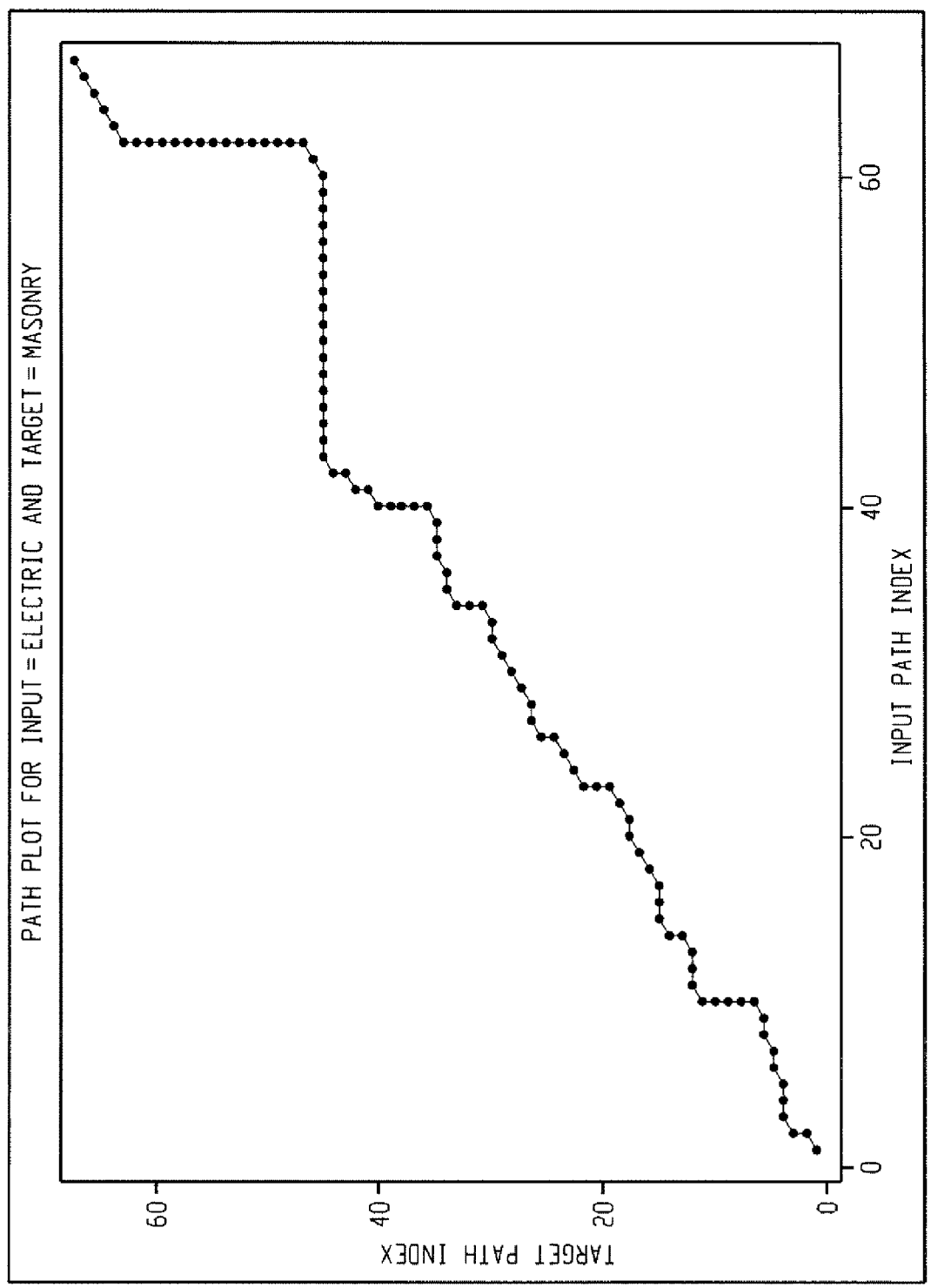
Figure 13:
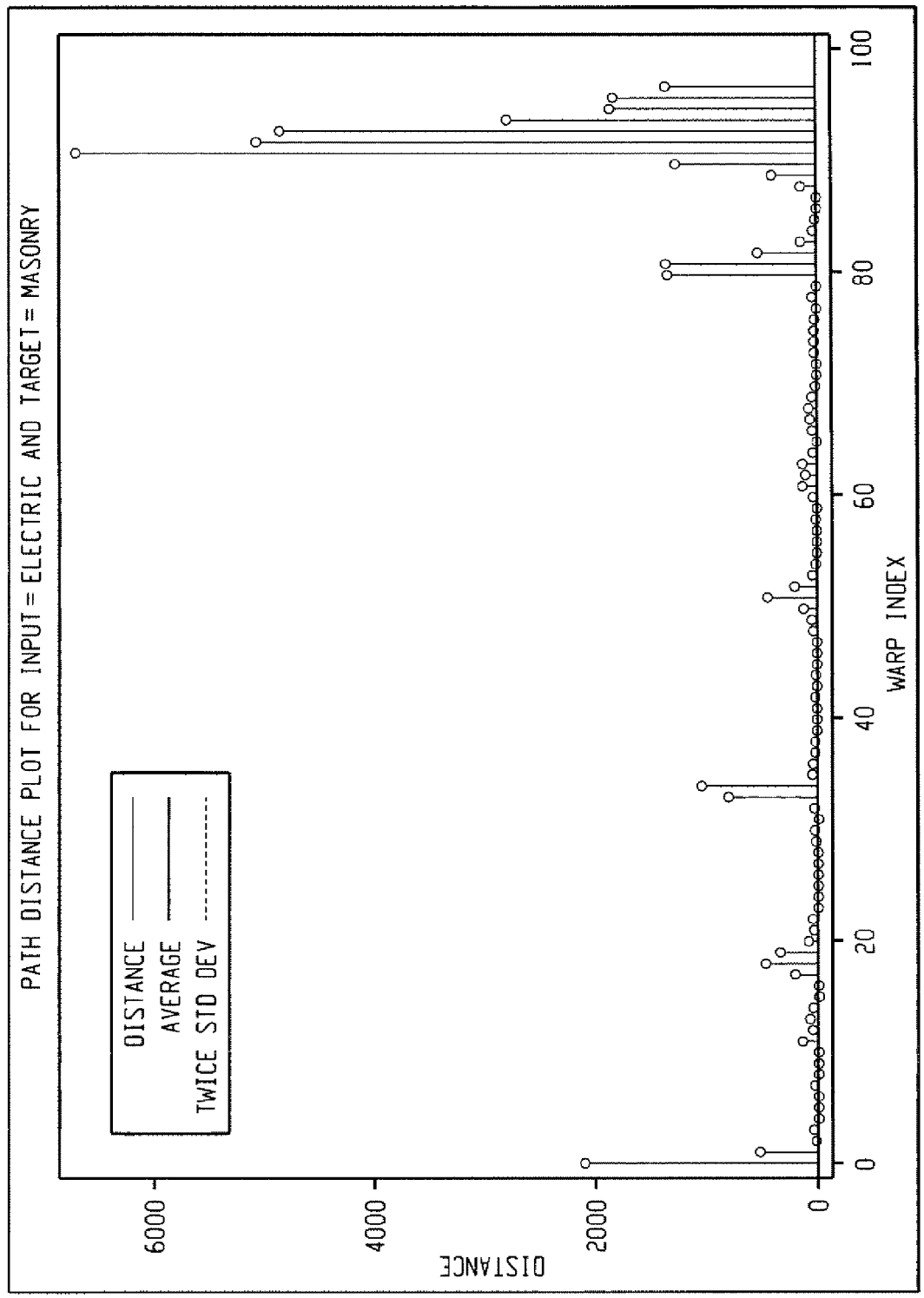

FIGS. 10-13 illustrate an example similarity analysis that computes similarity measures between a target and input sequence using dynamic time warping. Dynamic time warping expands and compresses the time axis using a dynamic program that minimizes a cost function (e.g., sum of the squared or absolute distance). FIG. 10 illustrates two time series, an input series 124 and a target series 126. FIG. 11 illustrates a warping plot that maps the input and target observations. FIG. 12 illustrates the warping path, wherein horizontal movement represents expansion and vertical movement represents compression. FIG. 13 illustrates the distances between the two warped sequences. The similarity measure in this example is the sum of the squared or absolute distance.

Referring again to FIG. 2, the properties transform block 109 receives the similarity matrix 122 and the reduced data 120 and generates a series properties matrix 130. Because the reduced data 120 and similarity matrix 122 have no dependency on time, they can be viewed as series properties based on the series index. The series properties can include the historical attribute data and derived historical time series data that do not depend on the time/cycle index: Let $\vec{z}_i^P = (Q_i, \vec{a}_i, \vec{r}, \vec{s}_i)$ represent the series properties vector for the $i^{th}$ dependent series, and let $Z^P = \{\vec{z}_i^P\}_{i-1}^N$ represent the series properties matrix. The resulting series properties matrix has uniform dimension, which may be needed for many data mining techniques, such as clustering data.

Given the series properties vector ($Z^P$) for each series, the distance measure block 110 can compute statistical distances between the series properties vectors using some statistical distance measure to generate a distance matrix 131. The distance measure may, for example, be specified by an analyst. In this manner, the statistical distances may be calculated as follows: $d_{i,j} = D(\vec{z}_i^P, \vec{z}_j^P)$, where D( ) measures the distance between the $i^{th}$ and $j^{th}$ series properties vector. The statistical distances may, for example, be calculated using the SAS/STAT® software sold by SAS Institute Inc. of Cary, N.C.

In this manner, some or all of the series properties may be used to compute the distances. For example, $d_{i,j}$ could represent the distance between diffusion parameters of the $i^{th}$ and $j^{th}$ products. In other examples, $d_{i,j}$ could represent the distance between growth parameters, exponential decay parameters, dynamic time warping similarity measures, derivative dynamic time warping similarity measures, or other distance measures. A time-independent distance matrix, D, associated with all of the time series and having dimensions (N×N) may then be calculate as follows: $D = \{\vec{d}_{i,j}\}_{i-1}^N$, where $\vec{d}_{i,j} = \{d_{i,j}\}_{j=1}^N$ is the distance vector associated with the $i^{th}$ series.

Figure 14:
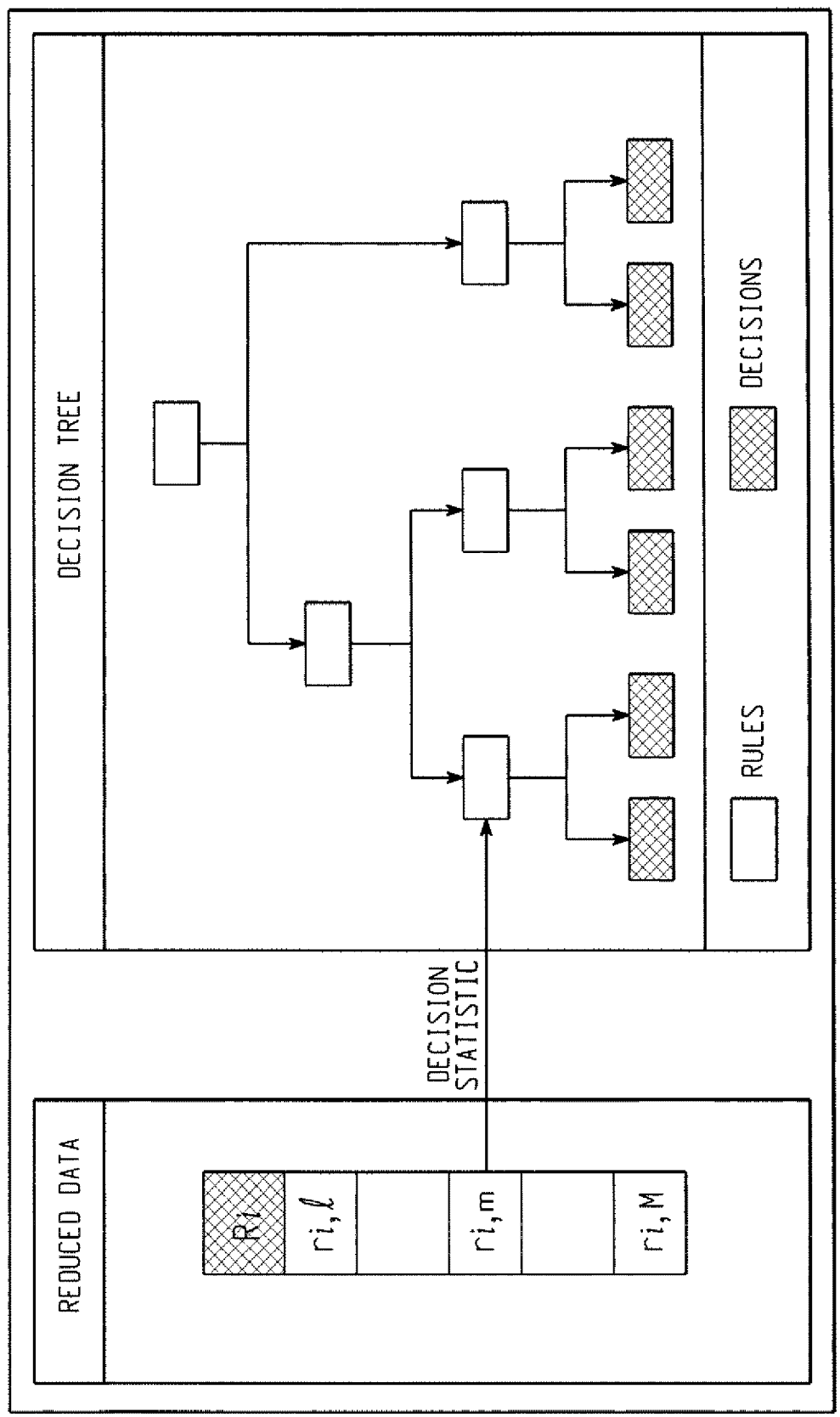
FIG. 14 illustrates an example data mining operation.

Referring again to FIG. 2, the data mining block 112 is used to perform one or more known data mining operations using the distance matrix 131. One example data mining operation that may be performed using the data mining block 112 is a decision tree, as illustrated in FIG. 14. Decision (classification) trees use decision rules in a hierarchical fashion to make a decision or classification. A node in the decision tree represents a decision rule. A leaf in the decision tree represents one possible decision. Each decision node uses a node statistic on which the decision is based. FIG. 14 illustrates an example of how the reduced data can provide one or more node statistics used in the decision tree.

Another example data mining operation that may be performed using the data mining block 112 is a cluster analysis. A cluster analysis of the transactional data may be performed to place the transactional data objects into groups or clusters suggested by the data, such that objects in a given cluster tend to be similar and objects in different clusters tend to be dissimilar. Depending on the clustering algorithm being employed, coordinate data, distance data or a correlation or covariance matrix can be used in the cluster analysis. Given a set of reduced (coordinate) data, clustering analysis groups the rows of the reduced data. Because each reduced matrix row, $R_i$ uniquely maps to one series, $Y_i$, the series are indirectly clustered. Likewise, given a distance matrix, clustering analysis groups the rows of the distance matrix. Because each distance matrix row, $D_i$, uniquely maps to one series, $Y_i$, the series are indirectly clustered.

Another example data mining operation that may be performed using the data mining block 112 is a sampling analysis. A sampling analysis of the transactional data may be performed to extract samples from the data. For instance, in order to efficiently explore, model and assess model results for the transactional data, random samples may be extracted from the database. The sample should be large enough to contain the significant information, yet small enough to process. In addition, for some data mining techniques, such as neural networks, more than one sample may be needed (e.g., training, testing and validation samples). Once a model has been assessed or evaluated for effectiveness, the model can then be applied to the entire database.

There are various ways to sample data. For instance, observation sampling may be more appropriate for reduced (coordinate) data, and longitudinal sampling may be more appropriate for series (longitudinal) data. To illustrate observation sampling, assume that there are N observations in the reduced (coordinate) data. Typically, for coordinate data, a random sample would be selected from the N observations; that is, $N_{SAMPLE}$ random integers would be selected between one and N without replacement. The sample data would then be created from the observations whose observation index corresponds to one of the $N_{SAMPLE}$ randomly selected integers. The sample data dimensions are ($N_{SAMPLE} \times M$) with $R_{SAMPLE} \subseteq \{R_1, \ldots, R_N\}$.

To illustrate longitudinal sampling, assume that there are N series with lengths $\{T_1, \ldots T_N\}$. Then, the total number of observations is $NOBS_{TOTAL} = T_1 + \ldots + T_N$. Using observation sampling, a random sample would be selected from the $NOBS_{TOTAL}$ observations; that is, $NOBS_{SAMPLE}$ random integers would be selected between one and $NOBS_{TOTAL}$ without replacement. The sample data would then be created from the observations whose observation index corresponds to one of the $NOBS_{SAMPLE}$ randomly selected integers. However, for series data, observation sampling is inadequate because the ability to exploit the relationship between observations within a single series is lost.

For series (longitudinal) data, a random sample should be selected from the N series; that is, $N_{SAMPLE}$ random numbers would be selected between one and N without replacement. The sample data would then be created from the series whose series index corresponds to one of the $N_{SAMPLE}$ randomly selected integers. For series data, longitudinal sampling is more appropriate; and the sample data dimensions are ($N_{SAMPLE} \times T$) with $Y_{SAMPLE} \subseteq \{Y_1, \ldots, Y_N\}$ For multivariate series analysis, all of the covariate series should be randomly selected jointly.

Figure 5:
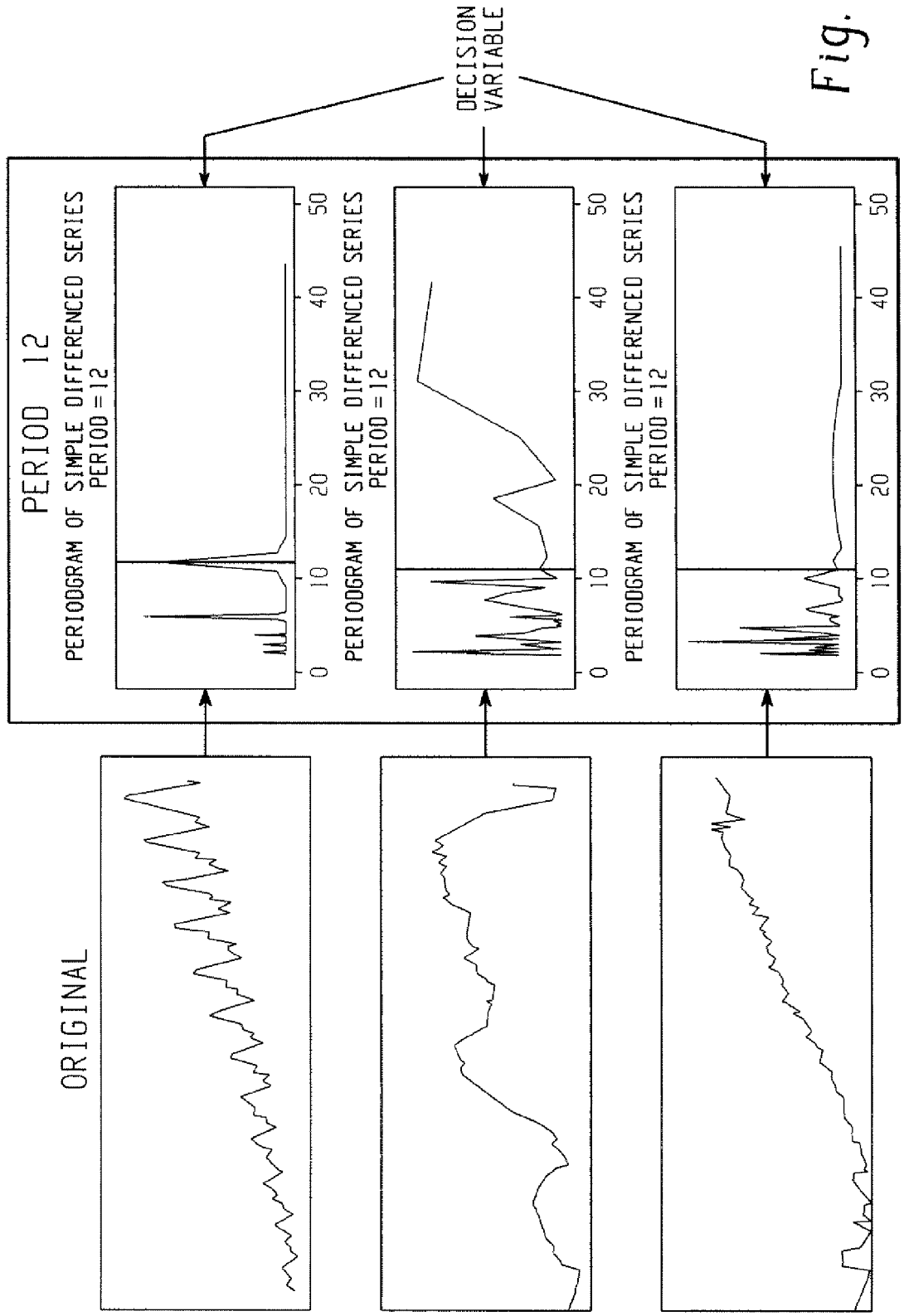
FIGS. 5-9 illustrate example dimension reduction operations.
Figure 6:
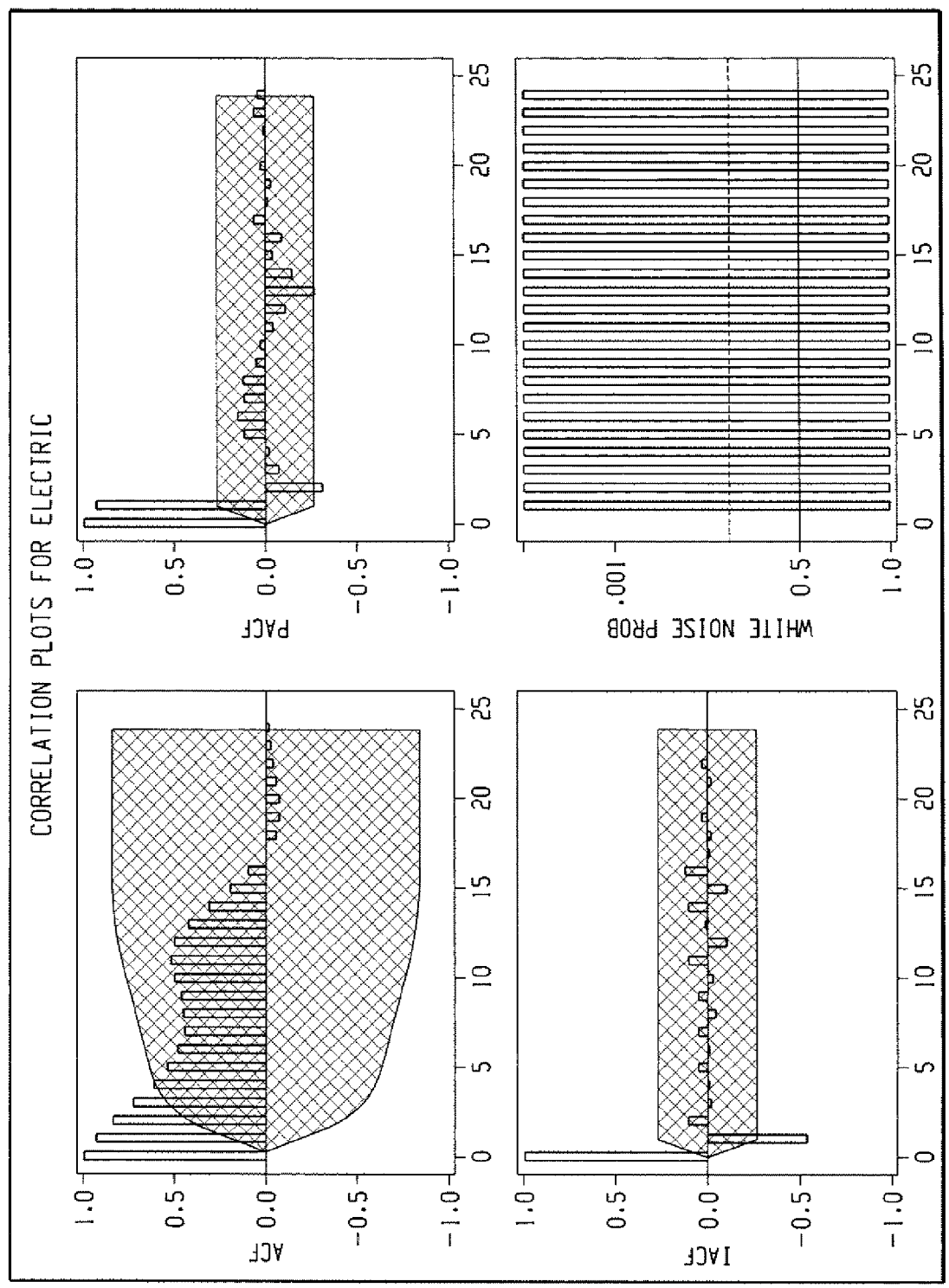
Figure 7:
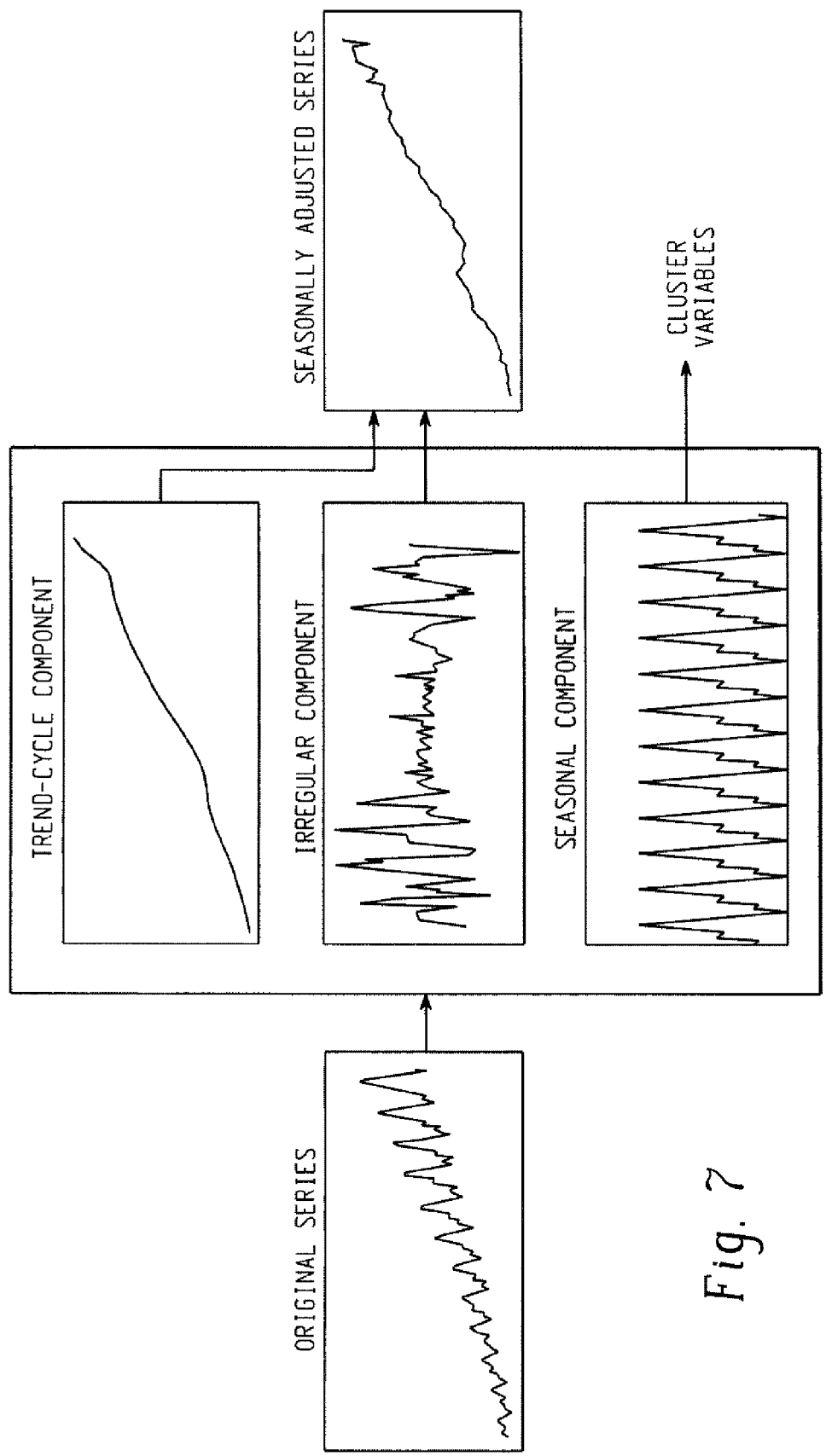
Figure 8:
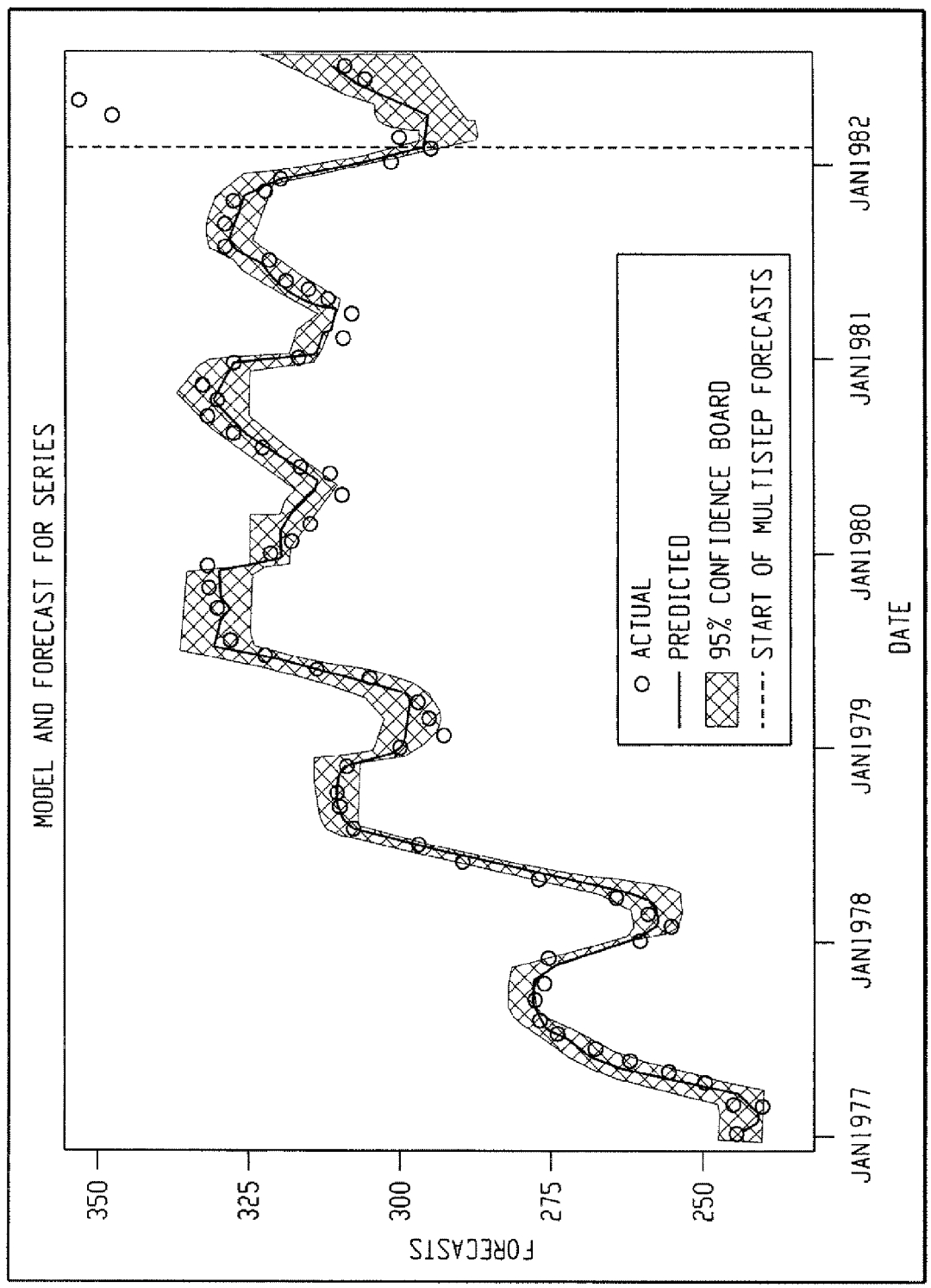
Figure 9:
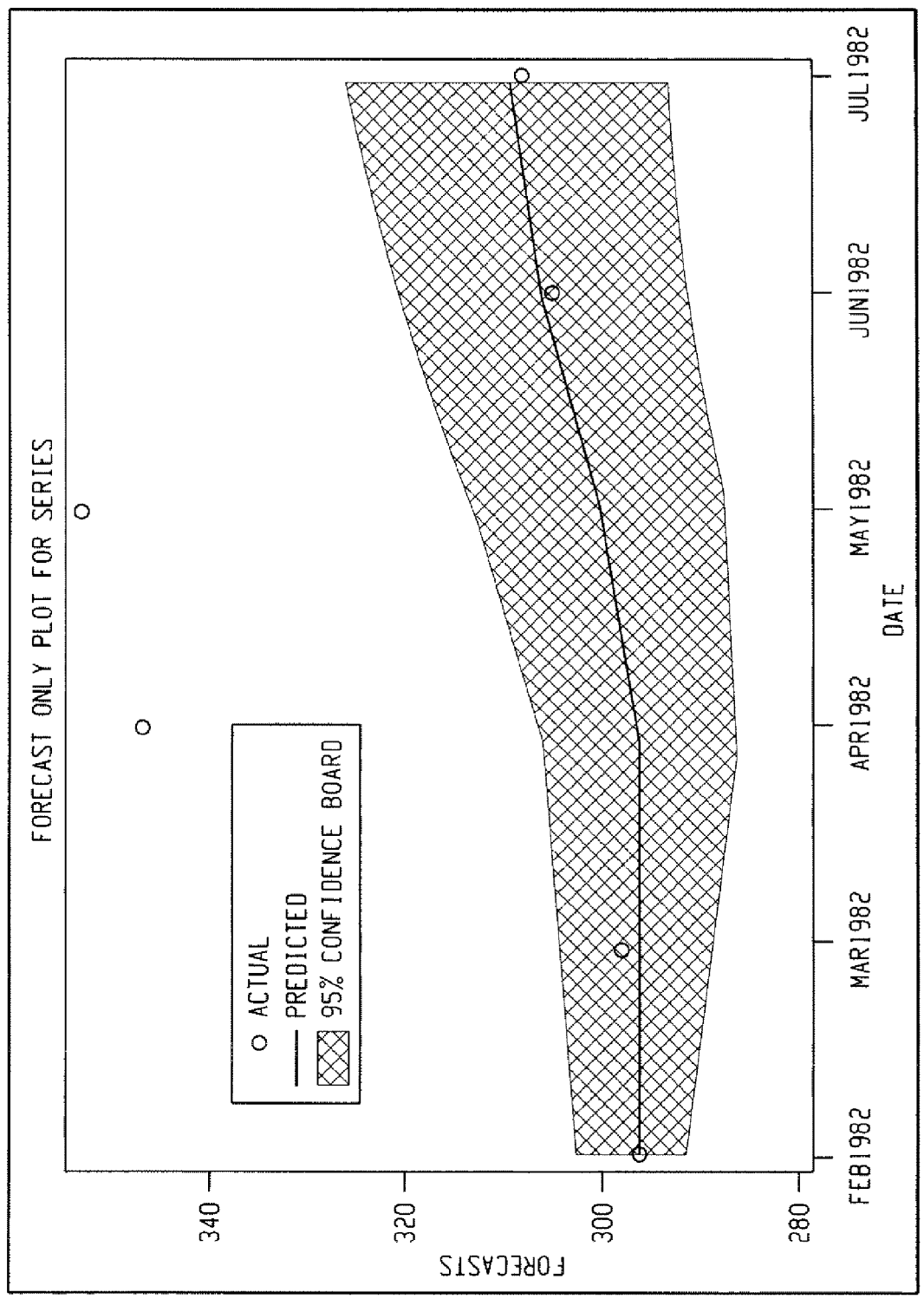

FIGS. 5-9 illustrate example dimension reduction operations which may be performed by the data reductions blocks 32, 104 in FIGS. 1 and 2. FIG. 5 depicts three examples of a frequency domain analysis. FIG. 6 illustrates an example of a time domain analysis. FIG. 7 shows an example of a seasonal decomposition/adjustment analysis. FIGS. 8 and 9 depict examples of time series modeling.

Referring first to FIG. 5, frequency domain analysis is typically employed to decompose a time series into several orthonomal periodic components. Computing the frequency domain properties of the time series can help to reduce the amount of information that must be analyzed. Some example frequency domain techniques include periodogram analysis, spectral density analysis, white noise analysis, wavelet analysis and many others. The examples shown in FIG. 5 illustrate periodograms associated with three example time series with period 12 (monthly) indicated by the vertical lines. As shown, a frequency domain analysis can reduce a single time series to a small set of frequency domain statistics.

Referring now to FIG. 6, a time domain analysis is typically employed to understand the relationship between a current observation of a time series and previous observations (e.g., time lags). Computing time domain properties of the time series can help to reduce the amount of information that must be analyzed. Some example time domain analysis techniques include, autocorrelation analysis, partial autocorrelation analysis, inverse autocorrelation analysis, extended sample autocorrelation analysis, smallest canonical correlation analysis, stationary analysis (nonseasonal and seasonal) and many others. FIG. 6 illustrates the autocorrelation and white noise probabilities associated with a monthly series. As illustrated, time domain analysis can reduce a single time series to a small set of time domain statistics.

Referring to FIG. 7, time series often have a seasonal component that causes the time series to fluctuate with the changing seasons. For example, ice cream sales are typically higher in the summer months than in the winter months. In general, seasonal decomposition techniques decompose an original time series. In general, seasonal decomposition techniques decompose the original time series ($O_t$) into seasonal ($S_t$), trend ($T_t$), cycle ($C_t$), and irregular ($I_t$) components. Computing the seasonally decomposed properties of the time series can help reduce the amount of information that must be analyzed. There are four commonly used seasonal decomposition techniques: additive ($O_t=TC_t+S_t+I_t$), multiplicative ($O_t=TC_tS_tI_t$), log-additive ($\log(O_t)=TC_t+S_t+I_t$), and pseudo-additive ($O_t=TC_t(S_tI_t-1)$). The trend-cycle component ($TC_t$) can be further decomposed into trend ($T_t$) and cycle ($C_t$) components using fixed-parameter filtering techniques. FIG. 7 illustrates the seasonal decomposition of an example time series. As illustrated, seasonal decomposition can reduce a single time series to a small set of seasonal indices or time-varying trend statistics.

Referring now to FIG. 8, time series models may be used to describe the underlying data-generating process of a time series. Applying a time series model to a time series can help reduce the amount of information that must be analyzed. Additionally, after fitting the time series model to the time series data, the fitted model can be used to determine departures (outliers) from the data-generating process or to forecast function components (e.g., future trend, seasonal or cycle estimates). Some time series modeling techniques include ARILMA, GARCH, state space or unobserved component models, exponential smoothing models, intermittent (interrupted) models and many other. Time series modeling can reduce a single time series to a small set of modeling parameters, final components (level, slope, season, and/or cycle), or departures from the assumed data-generating process.

Fitted time series models can be used to forecast time series. These forecasts can be used to predict future observations as well as to monitor more recent observations for anomalies using holdout sample analysis. For example, after fitting a time series model to the time series data with a holdout sample excluded, the fitted model can be used to forecast within the holdout region. Actual values in the holdout sample that are significantly different from the forecasts could be considered anomalies. Some example statistics that can be used in a holdout sample analysis include performance statistics (e.g., RMSE, MAPE, etc.), prediction errors (e.g., absolute prediction errors that are three times prediction standard errors), confidence limits (e.g., actual values outside confidence limits), and many others. FIG. 8 illustrates an example time series model fitted with a six-observation holdout sample excluded. FIG. 9 illustrates the actual values and forecasts in the holdout sample. Notice that FIG. 9 includes two anomalies, as indicated by the confidence bands. As illustrated, time series modeling can reduce a single time series to a small set of holdout sample statistics. These statistics can be used to determine the presence of anomalies.

Figure 15:
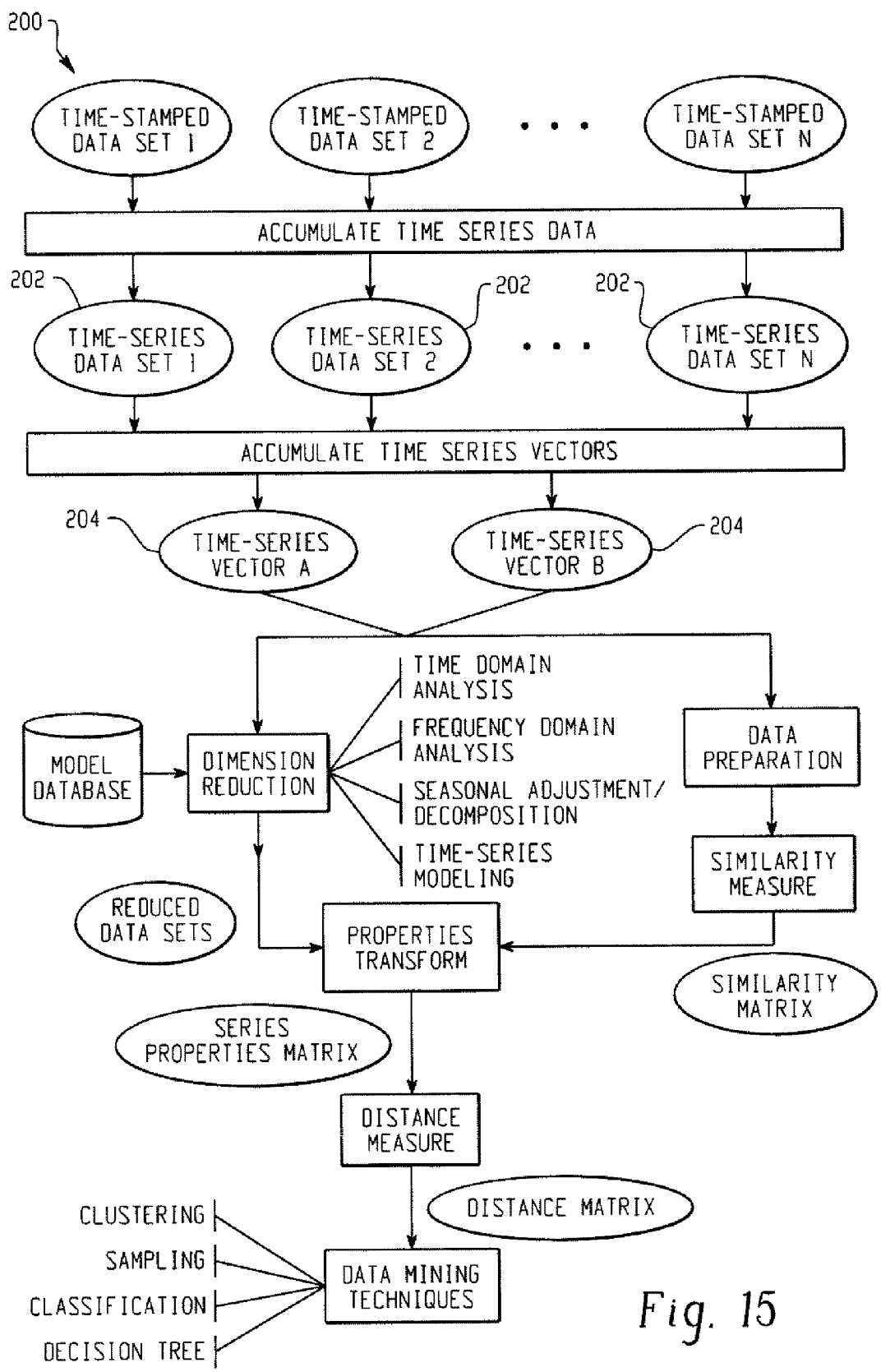
FIG. 15 is a block diagram illustrating another example system and method for generating a data mining analysis of transactional data.

This written description uses examples to disclose the invention, including the best mode, and also to enable a person skilled in the art to make and use the invention. The patentable scope of the invention may include other examples that occur to those skilled in the art. For instance, FIG. 15 depicts another example system 200 for generating a data mining analysis of transaction data. In this example, the time-series data 202 is further accumulated into a plurality of time-series vectors 204, which are input to the dimension reduction and data preparation blocks.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The data corresponding to the systems and methods (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, a software function unit of code, an object (as in an object-oriented paradigm), an applet, in a computer script language, or as another type of computer code. The software components and/or functionality may be located on a single computer or distributed across multiple computers depending upon the situation at hand.

The invention claimed is:

1. A computer implemented method for generating a data mining analysis of transactional data, comprising:
   receiving, on one or more processors, time-variant time-series data relating to transactions of an organization;
   accumulating the time-variant time-series data into a plurality of time-series vectors;
   using the plurality of time-series vectors to concurrently perform a plurality of dimension reduction operations upon the time-variant time-series data and a similarity analysis upon the time-variant time-series data, wherein performing the plurality of dimension reduction operations generates reduced time-variant time-series data, and wherein performing the similarity analysis generates a similarity matrix;
   combining the similarity matrix and the reduced time-variant time-series data into a data matrix;
   performing a distance analysis using the data matrix to generate a distance matrix;
   performing a data mining operation using the distance matrix to generate the data mining analysis of the transactional data; and
   storing the data mining analysis in a computer-readable medium.

2. The method of claim 1, further comprising:
   receiving time-stamped transactional data; and
   accumulating the time-stamped transactional data to generate the time-variant time-series data.

3. The method of claim 1, wherein the plurality of dimension reduction operations includes a seasonal adjustment and decomposition analysis.

4. The method of claim 1, wherein the plurality of dimension reduction operations includes a component analysis.

5. The method of claim 1, wherein the plurality of dimension reduction operations includes a time domain analysis.

6. The method of claim 1, wherein the plurality of more dimension reduction operations includes a frequency domain analysis.

7. The method of claim 1, wherein the plurality of dimension reduction operations includes fitting the time-variant time-series data to a time-series model.

8. The method of claim 1, wherein the data mining operation is a clustering analysis.

9. The method of claim 1, wherein the data mining operation is a sampling analysis.

10. The method of claim 1, wherein the data mining operation is a data classification.

11. The method of claim 1, wherein the data mining operation is a decision tree.

12. The method of claim 1, further comprising:
    smoothing the time-variant time-series data prior to performing the similarity analysis.

13. The method of claim 1, wherein the data matrix is a series properties matrix.

14. A system for generating a data mining analysis of transactional data, comprising:
    one or more processors;
    one or more computer-readable storage mediums containing instructions operable to cause the one or more processors to perform operations including:
    receiving time-variant time-series data relating to transactions of an organization;
    accumulating the time-variant time-series data into a plurality of time-series vectors;
    using the plurality of time-series vectors to concurrently perform a plurality of dimension reduction operations upon the time-variant time-series data and a similarity analysis upon the time-variant time-series data, wherein performing the plurality of dimension reduction operations generates reduced time-variant time-series data, and wherein performing the similarity analysis generates a similarity matrix;
    combining the similarity matrix and the reduced time-variant time-series data into a data matrix;
    performing a distance analysis using the data matrix to generate a distance matrix; and
    performing a data mining operation using the distance matrix to generate the data mining analysis of the transactional data.

15. The system of claim 14, further comprising:
    receiving time-stamped transactional data; and
    accumulating the time-stamped transactional data to generate the time-variant time-series data.

16. The system of claim 14, wherein the plurality of dimension reduction operations includes a seasonal adjustment and decomposition analysis.

17. The system of claim 14, wherein the plurality of dimension reduction operations includes a component analysis.

18. The system of claim 14, wherein the plurality of dimension reduction operations includes a time domain analysis.

19. The system of claim 14, wherein the plurality of dimension reduction operations includes a frequency domain analysis.

20. The system of claim 14, wherein the plurality of dimension reduction operations includes fitting the time-variant time-series data to a time-series model.

21. The system of claim 14, wherein the data mining operation is a clustering analysis.

22. The system of claim 14, wherein the data mining operation is a sampling analysis.

23. The system of claim 14, wherein the data mining operation is a data classification.

24. The system of claim 14, wherein the data mining operation is a decision tree.

25. The system of claim 14, further comprising:
    smoothing the time-variant time-series data prior to performing the similarity analysis.

26. The system of claim 14, wherein the data matrix is a series properties matrix.

27. The system of claim 14, wherein the similarity analysis is a dynamic time warping analysis.

28. The system of claim 14, wherein the similarity analysis is a derivative dynamic time warping analysis.

29. The system of claim 14, wherein the similarity analysis is a least common subsequence similarity analysis.

30. A computer-readable storage medium encoded with instructions that when executed, cause a computer to perform a data mining analysis method, comprising:
  receiving time-variant time-series data relating to transactions of an organization;
  accumulating the time-variant time-series data into a plurality of time-series vectors;
  using the plurality of time-series vectors to concurrently perform a plurality of dimension reduction operations upon the time-variant time-series data and a similarity analysis upon the time-variant time-series data, wherein performing the plurality of dimension reduction operations generates reduced time-variant time-series data, and wherein performing the similarity analysis generates a similarity matrix;
  combining the similarity matrix and the reduced time-variant time-series data into a data matrix;
  performing a distance analysis using the data matrix to generate a distance matrix;
  performing a data mining operation using the distance matrix to generate the data mining analysis of the transactional data; and
  storing the data mining analysis.

31. A computer implemented method for generating a data mining analysis of transactional data, comprising:
  receiving, on one or more processors, time-variant time-series data relating to transactions of an organization;
  accumulating the time-variant time-series data into a plurality of time-series vectors;
  using the plurality of time-series vectors to concurrently perform a plurality of dimension reduction operations upon the time-variant time-series data and a similarity analysis upon the time-variant time-series data, wherein performing the plurality of dimension reduction operations generates reduced time-variant time-series data, and wherein performing the similarity analysis of the time-variant time-series data includes preparing the time-variant time-series data and then applying dynamic time warping to the prepared time-variant time-series data to generate a similarity matrix;
  combining the similarity matrix and the reduced time-variant time-series data into a data matrix;
  performing a distance analysis using the data matrix to generate a distance matrix; and
  performing a data mining operation using the distance matrix to generate the data mining analysis of the transactional data.

* * * * *

UNITED STATES PATENT AND TRADEMARK OFFICE
CERTIFICATE OF CORRECTION

PATENT NO. : 7,711,734 B2 Page 1 of 1
APPLICATION NO. : 11/696951
DATED : May 4, 2010
INVENTOR(S) : Michael James Leonard It is certified that error appears in the above-identified patent and that said Letters Patent is hereby corrected as shown below:

In Column 9, Line 58, Claim 6, delete the word "more".

Signed and Sealed this

Thirteenth Day of July, 2010

David J. Kappos
*Director of the United States Patent and Trademark Office*